United States Patent
Majima et al.

(10) Patent No.: US 7,803,734 B2
(45) Date of Patent: Sep. 28, 2010

(54) METAL CATALYST AND METHOD FOR PRODUCTION THEREOF

(75) Inventors: Masatoshi Majima, Osaka (JP); Kohei Shimoda, Osaka (JP); Kouji Yamaguchi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 708 days.

(21) Appl. No.: 11/628,874

(22) PCT Filed: May 20, 2005

(86) PCT No.: PCT/JP2005/009271

§ 371 (c)(1),
(2), (4) Date: Dec. 8, 2006

(87) PCT Pub. No.: WO2005/120703

PCT Pub. Date: Dec. 22, 2005

(65) Prior Publication Data

US 2007/0244003 A1 Oct. 18, 2007

(30) Foreign Application Priority Data

Jun. 10, 2004 (JP) .............................. 2004-172874
Aug. 26, 2004 (JP) .............................. 2004-247229

(51) Int. Cl.
*B01J 23/00* (2006.01)
*B01J 23/40* (2006.01)
*B01J 21/00* (2006.01)
*B01J 20/00* (2006.01)
*B01J 29/00* (2006.01)
*B01J 37/00* (2006.01)

(52) U.S. Cl. ........................ 502/185; 502/184; 502/305; 502/313; 502/314; 502/315; 502/316; 502/317; 502/319; 502/321; 502/324; 502/326; 502/337; 502/338; 502/339; 502/347; 502/350; 502/439

(58) Field of Classification Search ................. 502/184, 502/185, 305, 313, 314, 315, 316, 317, 319, 502/321, 324, 326, 337, 338, 339, 347, 350
See application file for complete search history.

(56) References Cited

U.S. PATENT DOCUMENTS 2,935,394 A 5/1960 Hiler (Continued)

FOREIGN PATENT DOCUMENTS

EP 0 325 567 1/1989

(Continued)

OTHER PUBLICATIONS

International Preliminary Report on Patentability and Written Opinion issued in International Patent Application No. PCT/JP2005/009271, dated Dec. 28, 2006.

(Continued)

*Primary Examiner*—Cam N Nguyen
(74) *Attorney, Agent, or Firm*—McDermott Will & Emery LLP

(57) ABSTRACT

The present invention relates to a metal catalyst containing fine metal particles, characterized in that the fine metal particles have a particle diameter of 3 nm or less and also have a proportion of metallic bond state of 40% or more, which is ascribed by subjecting to waveform separation of a binding energy peak peculiar to the metal as measured by using an X-ray photoelectron spectrometer. The fine metal particles are preferably fine platinum particles. The fine metal particles are preferably supported on the surface of carrier particles by reducing ions of metal to be deposited through the action of a reducing agent in a reaction system of a liquid phase containing the carrier particles dispersed therein, thereby to deposit the metal on the surface of carrier particles in the form of fine particles. The proportion of metallic bond state of the fine metal particles is adjusted within the above range by reducing after deposition thereby to decrease the oxidation state.

12 Claims, 6 Drawing Sheets

U.S. PATENT DOCUMENTS

| | | | |
|---|---|---|---|
| 3,167,525 A * | 1/1965 | Thomas | 523/300 |
| 3,520,723 A | 7/1970 | Sterman et al. | |
| 3,849,343 A | 11/1974 | Hoekstra | |
| 4,186,110 A * | 1/1980 | Jalan et al. | 502/101 |
| 4,192,907 A * | 3/1980 | Jalan et al. | 429/40 |
| 4,409,129 A * | 10/1983 | Takeuchi et al. | 502/185 |
| 4,499,205 A | 2/1985 | Masuda | |
| 4,548,921 A | 10/1985 | Geus et al. | |
| 4,572,813 A * | 2/1986 | Arakawa | 264/29.2 |
| 4,757,045 A | 7/1988 | Turner et al. | |
| 5,096,866 A * | 3/1992 | Itoh et al. | 502/101 |
| 5,209,976 A * | 5/1993 | Ogawa | 428/391 |
| 5,275,998 A | 1/1994 | Tsurumi et al. | |
| 5,445,886 A * | 8/1995 | Ogawa | 428/403 |
| 5,976,393 A * | 11/1999 | Abe | 216/18 |
| 5,977,012 A | 11/1999 | Kharas et al. | |
| 6,339,038 B1 | 1/2002 | Tada et al. | |
| 6,455,475 B1 * | 9/2002 | Ogure | 508/103 |
| 6,471,929 B1 * | 10/2002 | Kusunoki et al. | 423/245.3 |
| 6,569,358 B1 | 5/2003 | Tai et al. | |
| 6,815,391 B2 | 11/2004 | Xing et al. | |
| 7,288,502 B2 * | 10/2007 | Okanobori et al. | 502/185 |
| 7,378,450 B2 * | 5/2008 | Erkey et al. | 516/98 |
| 7,479,469 B2 * | 1/2009 | Ishihara et al. | 502/185 |
| 7,510,621 B2 * | 3/2009 | Sigler et al. | 156/273.9 |
| 2002/0192968 A1 * | 12/2002 | Yamashita | 438/694 |
| 2003/0025997 A1 * | 2/2003 | Kawazu et al. | 359/486 |
| 2003/0107024 A1 | 6/2003 | Tai et al. | |
| 2003/0232721 A1 | 12/2003 | Zhou et al. | |
| 2004/0166396 A1 * | 8/2004 | Gorer | 429/40 |
| 2006/0134318 A1 | 6/2006 | Hudd et al. | |
| 2006/0251952 A1 * | 11/2006 | Chondroudis et al. | 429/44 |
| 2007/0027031 A1 | 2/2007 | Ikeda et al. | |
| 2007/0051927 A1 * | 3/2007 | Itoh et al. | 252/500 |
| 2007/0224440 A1 * | 9/2007 | Kuwabara et al. | 428/570 |
| 2010/0136358 A1 | 6/2010 | Goia et al. | |

FOREIGN PATENT DOCUMENTS

| | | |
|---|---|---|
| JP | 2-65064 | 3/1990 |
| JP | 4-298238 | 10/1992 |
| JP | 2000-107606 | 4/2000 |
| JP | 2000-279811 | 10/2000 |
| JP | 2002-153760 | 5/2002 |
| WO | WO 03/064037 | 10/2002 |

OTHER PUBLICATIONS

United States Office Action issued in U.S. Appl. No. 12/686,265, mailed Jun. 9, 2010.

* cited by examiner

METAL CATALYST AND METHOD FOR PRODUCTION THEREOF

This application is the U.S. National Phase under 35 U.S.C. §371 of International Application No. PCT/JP2005/009271, filed on May 20, 2005, which in turn claims the benefit of Japanese Application No. 2004-172874, filed on Jun. 10, 2004 and Japanese Patent Application No. 2004-247229, filed on Aug. 26, 2004 the disclosures of which Applications are incorporated by reference herein.

TECHNICAL FIELD

The present invention relates to a metal catalyst which is preferably used as a catalyst for fuel cell or a catalyst for automobile exhaust gas, and a method for production thereof.

BACKGROUND ART

As a catalyst for fuel cell or a catalyst for automobile exhaust gas, metal catalysts made of metal, particularly noble metal such as platinum are used. Since noble metal element exist on the earth in a limited amount, it is required to decrease the amount to be used as small as possible and to improve the action suited for use as the catalyst as much as possible. Therefore, as the metal catalyst, for example, there can be used those having a structure in which fine particles of metal such as platinum are supported on the surface of carrier particles made of such as carbon black or an inorganic compound.

The catalytic action is mainly exerted on the surface of metal. Therefore, in order to decrease the amount of metal as small as possible while maintaining an excellent catalytic action in the metal catalyst having the structure described above, it is effective to use fine metal particles to be supported on the surface of carrier particles, having a particle diameter as small as possible and a large specific surface area.

Examples of the method for supporting fine metal particles on the surface of the carrier particles include high temperature treating method referred to as an impregnation method, liquid phase reduction method and vapor phase method. Among these methods, there has recently been prevailing the liquid phase reduction method in which manufacturing facilities can be simplified with ease, namely, a method comprising the step of reducing ions of metal to be deposited by the action of a reducing agent in a reaction system of a liquid phase containing carrier particles dispersed therein thereby to deposit the metal on the surface of the carrier particles in the form of fine particles.

In order to decrease the particle diameter of the fine metal particles to be formed by the liquid phase reduction method, it is effective to decrease the rate of reduction and deposition of ions of metal. It is important that a reducing agent having a reducing power as weak as possible is selected and used so as to meet these requirements. Therefore, there is proposed that a metal catalyst is prepared by depositing fine metal particles having a particle diameter as small as possible on the surface of the carrier particles through reduction using a reducing agent having a weak reducing power, for example, alcohol such as ethanol, alkanolamine or ascorbic acid (see, for example, Patent Documents 1 to 3).

In the metal catalyst having a structure in which fine metal particles are supported on the surface of carrier particles, the amount of fine metal particles to be supported and the distance between adjacent fine metal particles on the surface of carrier particles are considered to be important factors which exert an influence on catalytic activity. As the catalyst for fuel cell in which an operating temperature is comparatively low such as 100° C. or lower, such as direct methanol type or solid polymer type catalyst, for example, there can be used a metal catalyst in which fine metal particles such as fine platinum particles are supported on the surface of carbon particles.

However, there is a problem that, when the amount of fine metal particles to be supported is small because the distance between adjacent fine metal particles supported on the surface of carbon particles in the metal catalyst is too large, sufficient catalytic activity can not be obtained. That is, when the surface of exposed carbon widely exists on the pathway between fine metal particles through which oxygen gas or hydrogen gas diffuses, diffusion of the gas is inhibited and thus catalytic activity decreases.

Accordingly, taking account of an enhancement in catalytic activity, the amount of fine metal particles to be supported is preferably as large as possible. However, when the distance between adjacent fine metal particles decreases excessively because the amount of fine metal particles to be supported increases too much, there arises a problem that plural fine metal particles behave like one catalyst particle against a hydrogen gas or an oxygen gas and thus catalytic activity decreases.

Describing in more detail, a region referred to as a territory exists around individual fine metal particles supported on the surface of carrier particles in a size larger than the substantial size. For example, in case of a positive electrode of a fuel cell, an oxygen gas passes through a thin film constituting the territory and reaches the surface of the fine metal particles, where it is subjected to a reductive reaction. However, when the distance between adjacent fine metal particles is too small, territories overlap each other and plural territory compete with each other for one oxygen molecule, and thus catalytic activity decreases.

Namely, the amount of fine metal particles to be supported, and the distance between adjacent fine metal particles on the surface of carrier particles are antinomic to each other. Therefore, Patent Document 4 proposes that, by defining a minimum distance between fine metal particles which is free from overlap of territories, the amount of fine metal particles to be supported and the distance between fine metal particles are well balanced and thus catalytic activity of the metal catalyst is improved.

Patent Document 1: Japanese Unexamined Patent Publication No. JP04-298238A(1992) (claim 1, columns 0003 to 0005)

Patent Document 2: Japanese Unexamined Patent Publication No. JP2000-107606A (columns 0012 to 0013)

Patent Document 3: Japanese Unexamined Patent Publication No. JP2000-279811A (claims 1 and 2, columns 0013 to 0015)

Patent Document 4: Japanese Unexamined Patent Publication No. JP02-065064A(1990) (claims; page 2, upper right column, line 14 to the same page, lower left column, line 18)

DISCLOSURE OF THE INVENTION

Problems to be Solved by the Invention

According to the liquid phase reduction method using a reducing agent having a weak reducing power described in Patent Documents 1 to 3, it is possible to form fine metal particles which has sufficiently small particle diameter of 3 nm or less, for example, and also has large specific surface area, based on catalytic activity theory. However, actual catalytic activity of the metal catalyst containing such fine metal particles does not sufficient reach the range to be estimated from the particle diameter and the specific surface area of fine metal particles at present.

The range of the distance between centers of adjacent fine metal particles of more than 15 nm defined in Patent Document 4 is merely the range suited to obtain the highest catalyst efficiency by being well balanced with the amount of fine metal particles to be supported and the distance between fine metal particles, which are antinomic in fine metal particles having a large particle diameter of more than 3 nm.

According to the present inventors' study, when this definition of the distance is applied in the metal catalyst in which fine metal particles have a particle diameter of 3 nm or less, the amount of fine metal particles to be supported drastically decreased. Therefore, even if actual catalytic activity of the metal catalyst containing such fine metal particles reaches the range to be estimated from the particle diameter and the specific surface area of fine metal particles, catalytic activity may decrease.

An object of the present invention is to provide a metal catalyst which contains fine metal particles having a small particle diameter and a large specific surface area and also has high catalytic activity which corresponds to the particle diameter and the specific surface area of fine metal particles, and to provide a method for production thereof.

Means for Solving the Problems

It is known that a mechanism of catalytic activity on the surface of fine metal particles varies depending on the objective catalytic reaction and, for example, catalytic activity of the oxygen reduction reaction due to platinum depends on the crystal plane orientation of platinum. It is said that the catalytic reaction easily occurs at singular points such as kink or step in the crystal as compared with the plane formed of a metal crystal.

However, in any catalytic reaction, it is preferred that a metal element is exposed in the state of metal at an active site of the surface of fine metal particles so as to improve catalytic activity, considering that species to be activated pass through the process of being adsorbed at the catalytic active site.

Therefore, the reason why catalytic activity of a conventional metal catalyst containing fine metal particles formed by the liquid phase reduction method does not reach the range which corresponds to the particle diameter and the specific surface area of fine metal particles is considered that metal elements are not sufficiently exposed in the state of metal on the surface of fine metal particles. The cause of this is presumed that almost all of metal elements are oxidized to an oxide on the surface of the fine metal particles.

In the liquid phase reduction method described previously, unlike the vapor phase method in which fine metal particles are formed in the low oxidation state or the impregnation method in which high temperature state is attained in the process for formation of fine metal particles, fine metal particles to be formed tend to be oxidized. Particularly, in case fine metal particles are formed over a long time by decreasing the deposition rate as small as possible using a reducing agent having a weak reducing power, fine metal particles are liable to be oxidized. Furthermore, in the nm-sized fine metal particles thus obtained, since surface activity is enhanced by increasing surface energy, as typified by a melting point lowering phenomenon to be known as the Kubo effect, fine metal particles are more likely to be oxidized.

Therefore, it is considered that almost all of metal elements particularly in the vicinity of the surface of fine metal particles are oxidized to an oxide in an atmospheric air at room temperature, although the degree of oxidation varies depending on the kind of metal. The degree of oxidation of metal elements is nearly constant according to the kind. Therefore, as the particle diameter of fine metal particles decreases, the proportion of the oxide based on the total volume increases and catalytic activity decreases.

Thus, the present inventors have studied about the proportion of metal elements, which are exposed in the state of metal on the surface of fine metal particles having a particle diameter of 3 nm or less, enough to obtain a metal catalyst having high catalytic activity corresponding to the particle diameter. As a result, they have found that catalytic activity of a metal catalyst containing fine metal particles can be improved to high level corresponding to the particle diameter and the specific surface area of fine metal particles by adjusting the proportion of metallic bond state, which is ascribed by subjecting to waveform separation of a binding energy peak peculiar to the metal as measured by using an X-ray photoelectron spectrometer, to 40% or more.

Therefore, the metal catalyst of the present invention is characterized in that the fine metal particles have a particle diameter of 3 nm or less and have a proportion of metallic bond state of 40% or more, which is ascribed by subjecting to waveform separation of a binding energy peak peculiar to the metal as measured by using an X-ray photoelectron spectrometer.

When the proportion of metallic bond state of fine metal particles exceeds 90%, catalytic activity becomes too high and the catalytic action due to fine metal particles is liable to be inhibited by catalyst poison, and thus catalytic activity of the metal catalyst may decrease. The proportion of metallic bond state of fine metal particles is particularly preferably 90% or less within the above range so as to improve catalytic activity of the metal catalyst while excluding an adverse influence due to catalyst poison.

Considering that the effect of improving catalytic activity of the metal catalyst is further improved while excluding an adverse influence due to catalyst poison, the proportion of metallic bond state of fine metal particles is particularly preferably from 50 to 80% within the above range.

Considering that excellent catalytic activity is obtained, the fine metal particles are preferably fine particles made of at least one metal selected from platinum, palladium, gold, silver, rhodium, iridium, ruthenium, osmium, cobalt, manganese, nickel, iron, chromium, molybdenum and titanium.

The fine metal particles are particularly preferably fine platinum particles and also have the proportion of metallic bond state of the fine platinum particles of 40% or more, which is ascribed by subjecting to waveform separation of a Pt4d5 peak as a binding energy peak peculiar to the platinum as measured by using an X-ray photoelectron spectrometer.

Considering productivity and handling properties, the metal catalyst of the present invention preferably has a structure in which a number of fine metal particles are supported on the surface of carrier particles having a particle diameter larger than the fine metal particles, and a number of fine metal particles in the metal catalyst having such a structure are preferably supported on the surface of carrier particles by a liquid phase reduction method capable of decreasing the particle diameter.

Namely, it is preferred that a number of fine metal particles are supported on the surface of carrier particles by reducing ions of metal to be deposited through an action of a reducing agent in a reaction system of a liquid phase containing the carrier particles dispersed therein, thereby to deposit the metal on the surface of the carrier particles in a form of fine particles.

According to the present inventors' study, a decrease in catalytic activity due to so-called "territory effect" does not occur in the metal catalyst which has a structure in which a number of fine metal particles are supported on the surface of carrier particles and wherein the particle diameter of fine metal particles to be supported being 3 nm or less, as described above. Therefore, catalytic activity of the metal catalyst can be improved by adjusting the distance between centers of adjacent fine metal particles to less than 15 nm which is within the range defined in Patent Document 4 thereby to increase the amount of fine metal particles to be supported.

However, since fine metal particles having a particle diameter of less than 3 nm have high surface activity, when the distance between nearest neighbor surfaces of adjacent fine metal particles is 0.3 nm or less, clustering may occur even at comparatively low temperature at about 100° C. or lower to form coarse particles. When fine metal particles are converted into coarse particles, there arises a problem such as decrease in catalytic activity.

Considering a further improvement in catalytic activity of the metal catalyst, the distance between centers of adjacent fine metal particles on the surface of carrier particles is preferably less than 15 nm, and also the distance between nearest neighbor surfaces is preferably 0.3 nm or more.

Considering a further improvement in catalytic activity of the metal catalyst in which the distance between centers of adjacent fine metal particles is defined within the above range, a supported amount of fine metal particles, which is represented by percentage of the weight of fine metal particles to the weight of the metal catalyst, is preferably from 10 to 60% by weight.

In the metal catalyst having a structure in which a number of fine metal particles are supported on the surface of carrier particles and using an oxygen gas for carrying out the reduction reaction in a positive electrode of a fuel cell, an exposed crystal plane of the respective fine metal particles is oriented to a (111) plane which is excellent in catalytic activity of the reduction reaction.

In case of the catalyst for fuel cell, carbon black having electroconductivity is preferably used as the carrier particles. As a BET specific surface area of carbon black decreases, the distance between deposited fine metal particles decreases when ions of metal are reduced by a liquid phase reduction method thereby to deposit metal on the surface of carbon black in the form of fine particles. Therefore, a plurality of adjacent fine metal particles may be fused during the growth process thereof and thus the particle diameter of fine metal particles tends to increase.

According to the present inventors' study, in order to decrease the particle diameter of fine metal particles as small as possible within a range of 3 nm or less while preventing the fine metal particles from fusing with each other, the BET specific surface area of carbon black is preferably 500 m$^2$/g or more.

Since carbon black having a BET specific surface area of more than 1500 m$^2$/g has poor electroconductivity, catalyst efficiency may decrease when the metal catalyst is used as a catalyst for fuel cell. Therefore, the BET specific surface area of carbon black is preferably within a range from 500 to 1500 m$^2$/g, considering that fine metal particles having a particle diameter as small as possible are supported on the surface of carbon black as carrier particles by the liquid phase reduction method and electroconductivity of carbon black is enhanced.

In order to adjust the BET specific surface area of carbon black within the above range, carbon black preferably has a bulk density of 10 to 50 g/liter.

In order to adjust the BET specific surface area of carbon black within the above range and to prevent a decrease in catalytic activity due to clustering of a plurality of fine metal particles, those obtained by grinding raw carbon black material having a chain structure so as to cut the chain structure are preferably used as the carbon black.

The metal catalyst of the present invention is preferably used as a catalyst for fuel cell or a catalyst for automobile exhaust gas, employing its high catalyst efficiency.

In order to produce the metal catalyst of the present invention, fine metal particles formed may be subjected to a reduction treatment. Namely, the method for production of the metal catalyst of the present invention comprises the step of reducing fine metal particles thereby to decrease an oxidation state, thus adjusting the proportion of metallic bond state to 40% or more, which is ascribed by subjecting to waveform separation of a binding energy peak peculiar to the metal as measured by using an X-ray photoelectron spectrometer.

Examples of the method of reducing fine metal particles include a liquid phase method in which fine metal particles are reduced by an action of a reducing agent in a liquid phase. In the liquid phase method, a reducing agent having a redox potential baser than that of metal to be reduced is preferably selectively used as the reducing agent so as to improve efficiency of the reduction treatment and to improve productivity of the metal catalyst.

In case the fine metal particles are fine platinum particles, examples of the reducing agent having a redox potential baser than that of platinum include trivalent titanium ion, sodium hypophosphite, hydrazine, divalent to tetravalent vanadium ions, or sodium borohydride.

Examples of another method of reducing fine metal particles include a vapor phase method in which the fine metal particles are reduced by the action of a reducing agent in a vapor phase, a microwave heating method in which the fine metal particles are reduced by microwave heating, and an electrochemical method in which the fine metal particles are electrochemically reduced by applying an electric current in an electrolytic solution.

In order to prepare a metal catalyst having a structure in which a number of fine metal particles are supported on the surface of carrier particles, prior to the step of adjusting the proportion of metallic bond state of fine metal particles, the step of reducing ions of metal to be deposited through an action of a reducing agent in a reaction system of a liquid phase containing the carrier particles dispersed therein, thereby to deposit the metal on the surface of the carrier particles in the form of fine particles is preferably conducted. Considering the particle diameter of fine metal particles to be deposited as small as possible, at least one selected from the group consisting of alcohols, sugar alcohols and reducing sugars is used as the reducing agent for the above-mentioned step of reducing.

BEST MODE FOR CARRYING OUT THE INVENTION

<<Metal Catalyst>>

A metal catalyst of the present invention is characterized in that containing fine metal particles having a particle diameter of 3 nm or less and having a proportion of metallic bond state of 40% or more, which is ascribed by subjecting to waveform separation of a binding energy peak peculiar to the metal as measured by using an X-ray photoelectron spectrometer.

In the present invention, particle diameter of the fine metal particles is limited to 3 nm or less. When particle diameter of the fine metal particles exceeds 3 nm, it is because the specific surface area becomes small. Therefore, even if the proportion of metallic bond is adjusted to 40% or more, the effect of improving the catalyst efficiency of metal catalyst is not acquired. Since such fine metal particles having a large particle diameter are in a strong metallic state, when the proportion of metallic bond state on the surface of the fine metal particles is adjusted to 40% or more, there arises a problem that the catalytic action due to fine metal particles is liable to be inhibited by catalyst poison. Therefore, the particle diameter of the fine metal particles is limited to 3 nm or less.

Considering that catalytic activity of the metal catalyst is improved as much as possible while excluding an adverse influence due to catalyst poison, the particle diameter of the fine metal particles is preferably 2 nm or less, and more preferably 1 nm or less, within the above range. The lower limit of the particle diameter of the fine metal particles is not specifically limited as far as fine metal particles are fine particles having a minimum particle diameter which can be deposited by the above-mentioned liquid phase reduction method and also can function as the catalyst.

X-ray photoelectron spectrometer (XPS or ESCA) is one of typical surface analyzers and is used for analyzing the kind of elements within the range from the surface of the solid to the depth of several nm(s) and the state of a chemical bond thereof. It is also possible to analyze the surface after removing a contaminant of the outermost surface and to analyze in the depth direction to submicron order by etching due to irradiation with Ar ions.

Figure 1:
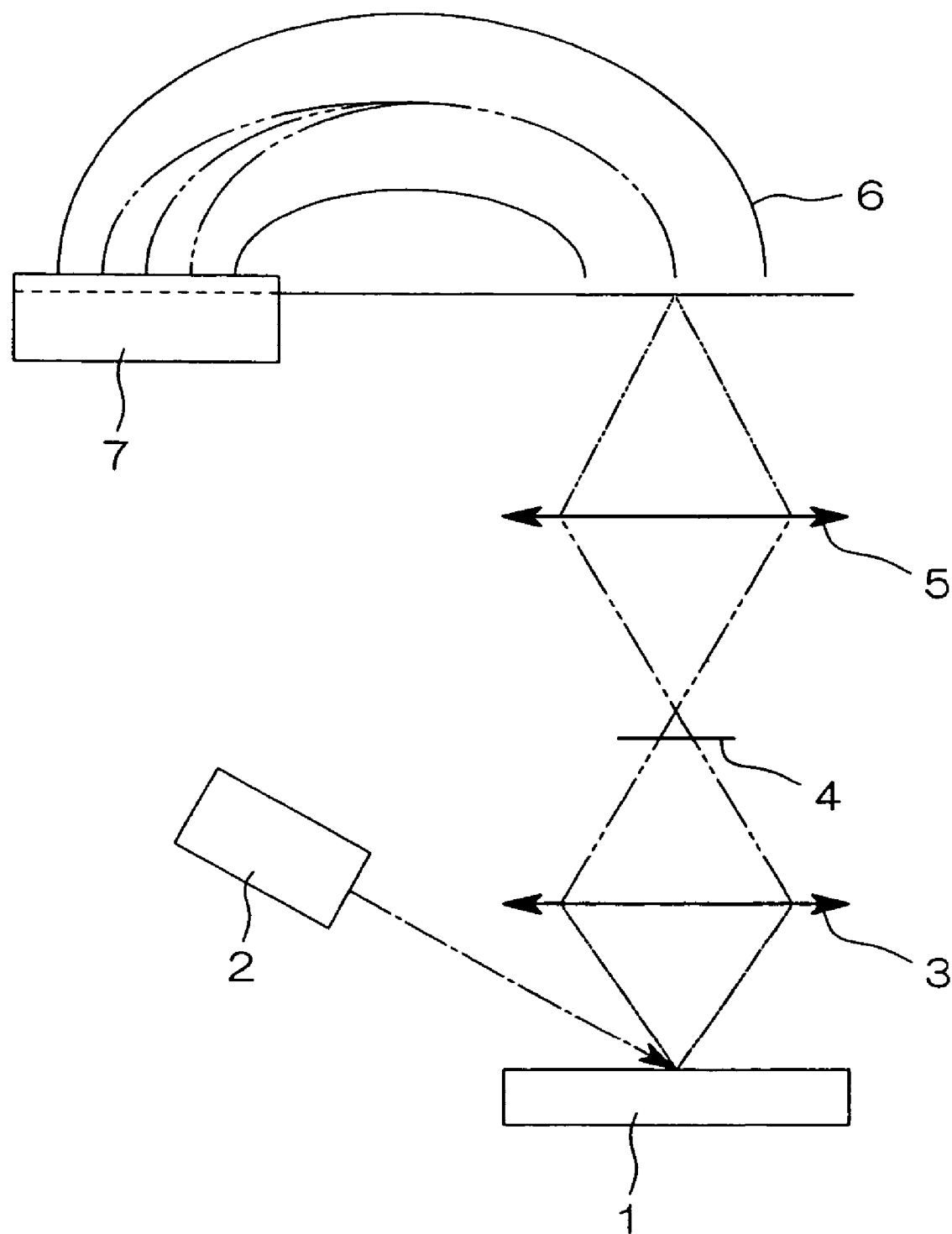
FIG. 1 is a schematic view showing the constitution of an X-ray photoelectron spectrometer used to measure a proportion of metallic bond state of fine metal particles in a metal catalyst of the present invention.

In the measurement using the above X-ray photoelectron spectrometer, as shown by an arrow written by a dashed-dotted line in FIG. 1, the surface of a solid sample 1 is irradiated with soft X-ray (AlKα ray or MgKα ray) having specific energy from an irradiation X-ray source 2 under high vacuum. Consequently, since electrons (photoelectrons) are emitted from the solid sample 1 due to the photoelectric effect as shown by a dashed-two dotted line in the drawing, electrons are transmitted to an analyzer 6 via such as a magnetic lens 3, an aperture 4 and an electrostatic lens 5, separated by kinetic energy of electrons and then detected by a detector 7, and thus the surface state of the solid sample 1 is detected as a spectrum of electrons each having different kinetic energy.

Photoelectrons are also emitted from the deep region of the solid sample but kinetic energy thereof is lost by inelastic scattering until reach the surface of the sample, therefore, the photoelectrons are not detected as a peak in the spectrum, resulting in the background of the spectrum. Therefore, only photoelectrons in the region of the depth of several nm(s), which can be escaped from the surface of the sample without causing inelastic scattering, are detected as a peak and used for analysis.

The abscissa of the spectrum shows binding energy of electrons, while the ordinate shows a frequency of appearance of electrons, namely, signal strength. The binding energy (Eb) is determined as a difference obtained by subtracting kinetic energy (Ek) of photoelectrons from energy (E0) of soft X-ray irradiated (Eb=E0−Ek). Since inner shell electrons of various atoms have peculiar binding energy, the kind of the element can be examined from the detected binding energy of electron and also a proportion of the element can be examined from the signal strength. The detectable elements are from Li to U. The detection limit varies depending on the element, but is about 0.1%.

When various elements differ in the state of a chemical bond, binding energy slightly varies and thus the spectrum is distinguished and detected. Consequently, it becomes possible to perform analysis of a functional group of an organic substance (for example, determination of C—O, C=O, etc.) and analysis of an oxidation state of an inorganic substance (for example, determination of metal and oxidation state), for example. Analysis in the depth direction due to Ar ion etching is effective for an inorganic substance which is less likely to cause a change of the state due to ion irradiation.

Figure 2:
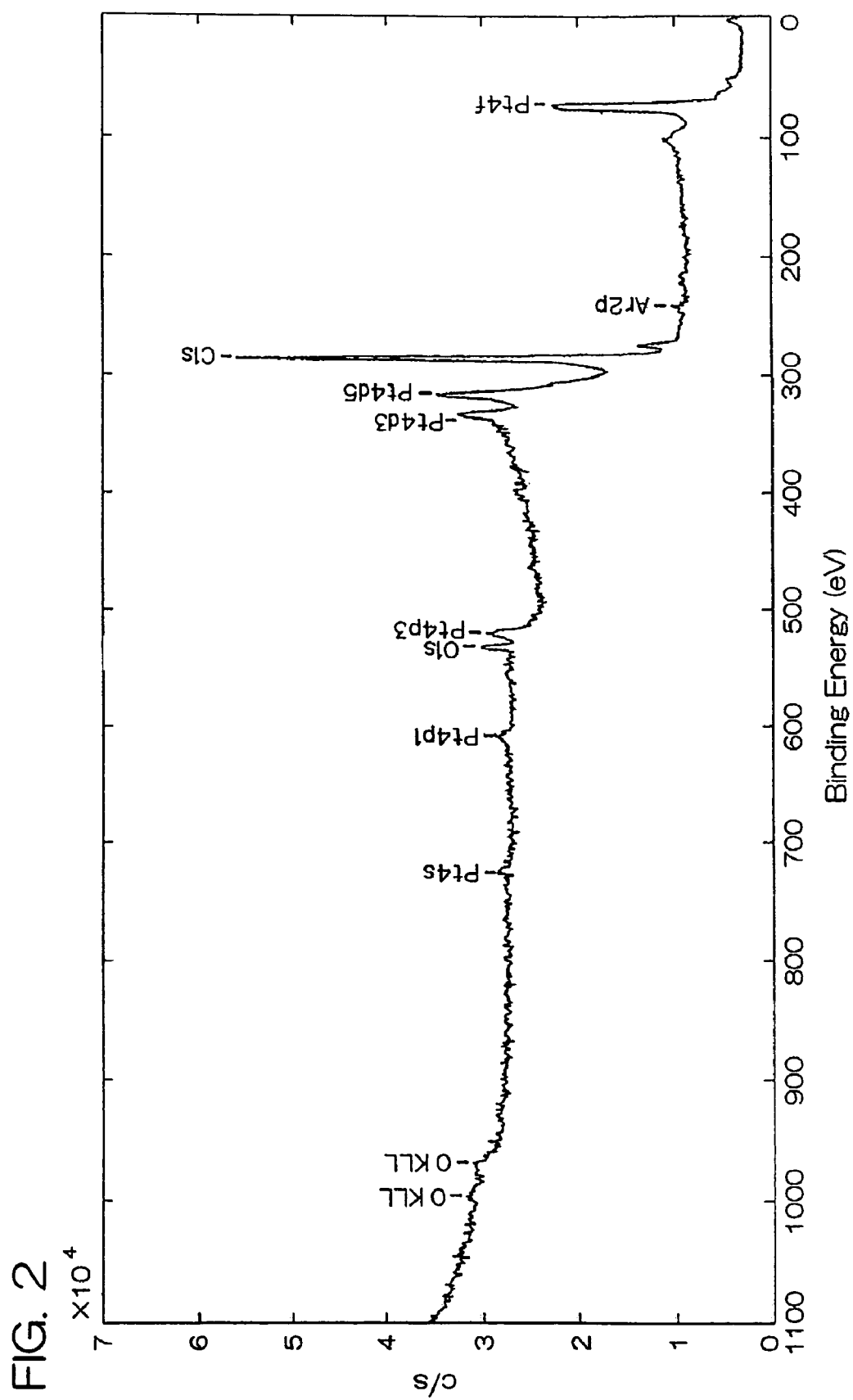
FIG. 2 is a graph showing a spectrum which represents a relation between a binding energy of electrons and a signal strength of the electrons obtained in case of measuring fine platinum particles supported on a surface of carrier particles in Example 1 of the present invention using the X-ray photoelectron spectrometer.

When fine metal particles of the metal catalyst are analyzed using the above X-ray photoelectron spectrometer, the proportion of metallic bond state on the surface of fine metal particles, which is ascribed by subjecting to waveform separation of a binding energy peak peculiar to metal, can be determined. That is, when fine metal particles are irradiated with soft X-ray having specific energy using the X-ray photoelectron spectrometer, there can be obtained a spectrum as shown in FIG. 2 in which the abscissa shows binding energy of electrons and ordinate shows signal strength of electrons. The spectrum of FIG. 2 shows the measurement results of fine platinum particles of Example 1 described hereinafter. In case of platinum, a Pt4d5 peak is subjected to waveform separation as a peculiar peak of binding energy.

Figure 3:
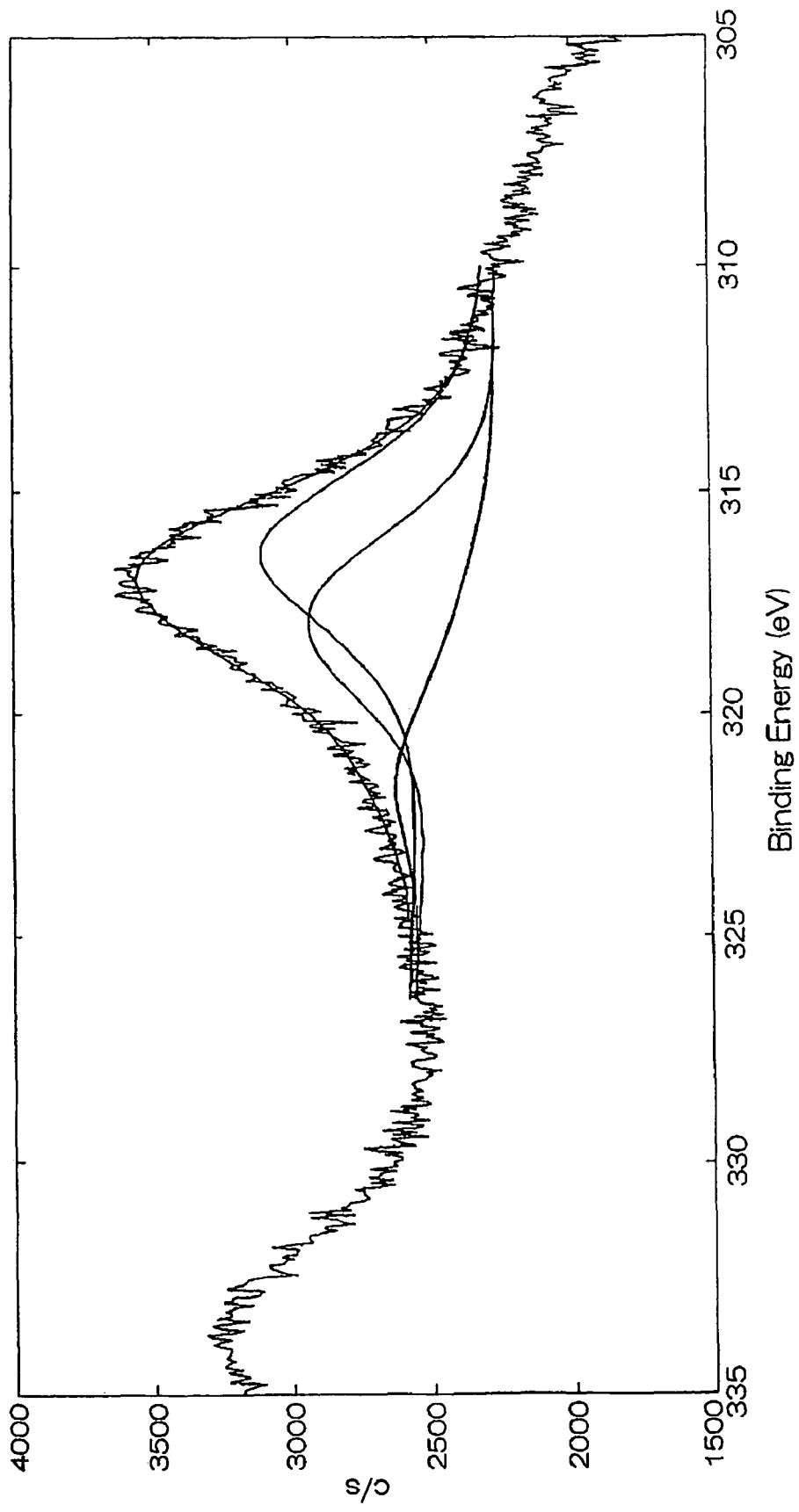
FIG. 3 is a graph showing a spectrum ascribed by subjecting to waveform separation of a Pt4d5 peak as a binding energy peak peculiar to the platinum among the spectrum of FIG. 2.

FIG. 3 is a graph showing a spectrum determined by waveform separation of a Pt4d5 peak. In FIG. 3, a curve having fine waveform at the top portion shows a spectrum measured actually, and a smooth curve overlapped with this spectrum shows an approximation curve obtained by approximation of the spectrum. Furthermore, three curves drawn thereunder respectively show a peak showing the metallic bond state of platinum elements, a peak showing the metastable bond state between a platinum element and an oxygen element and a peak showing the stable bond state between a platinum element and an oxygen element in order of intensity of the signal strength (in order of height of the peak) waveform separated from the approximation curve. In order to determine the proportion of metallic bond state from these waveform separated spectra, an area of each peak is measured and then the proportion of the area of peak showing the metallic bond state based on the total area is determined.

In the present invention, the proportion of metallic bond state on the surface of fine metal particles, which is obtained as described above, is limited to 40% or more. When the proportion of metallic bond state is less than 40%, a metal catalyst having high catalytic activity, which corresponds to the particle diameter and the specific surface area of fine metal particles, can not be obtained. Further, considering that catalytic activity of the metal catalyst is improved as much as possible while excluding an adverse influence due to catalyst poison, the proportion of metallic bond state is preferably 90% or less, and particularly preferably from 50 to 80%, within the above range.

Examples of the fine metal particles include fine particles made of at least one metal selected from platinum, palladium, gold, silver, rhodium, iridium, ruthenium, osmium, cobalt, manganese, nickel, iron, chromium, molybdenum and titanium, and fine platinum particles are particularly preferable. In fine platinum particles, a peculiar peak of binding energy to be subjected to waveform separation so as to determine the proportion of metallic bond state is a Pt4d5 peak, as described above.

The metal catalyst of the present invention may be composed of fine metal particles alone, which satisfy characteristics explained above, but preferably has a structure in which a number of fine metal particles are supported on the surface of carrier particles having the particle diameter larger than that of the fine metal particles, considering productivity and handling properties. Examples of the carrier particles include particles of an inorganic compound and carbon.

Examples of particles of the inorganic compound include particles of metal oxides of, for example, alumina such as γ-alumina, titanium oxide, silica, cerium oxide, zirconium oxide, iron oxide, and complex oxide thereof; particles of metal nitrides such as titanium nitride, iron nitride and silicon nitride, and particles of silver sulfide. The particle diameter of particles of the inorganic compound can be adjusted within an appropriate range according to applications of the catalyst, and is preferably within a range from 50 to 500 $m^2/g$ in terms of a specific surface area.

As the particles of carbon, various carbon blacks can be used and those having a BET specific surface area of 500 to 1500 $m^2/g$ are preferably used. In case the BET specific surface area of carbon black is less than 500 $m^2/g$, when ions of metal are deposited on the surface of carrier particles in the form of fine particles by the liquid phase reduction method, the distance between deposited fine metal particles decreases. Therefore, a plurality of adjacent fine metal particles may be fused during the growth process and thus the particle diameter of fine metal particles tends to increase even within the above-mentioned range of 3 nm or less.

On the other hand, since carbon black having a BET specific surface area of more than 1500 $m^2/g$ has low electroconductivity, catalyst efficiency may decrease when the metal catalyst is used as a catalyst for fuel cell. Considering that fine metal particles having a particle diameter as small as possible are supported on the surface of carbon black as carrier particles by a liquid phase reduction method and electroconductivity of carbon black is enhanced, the BET specific surface area of carbon black is preferably within a range from 700 to 1300 $m^2/g$, and particularly preferably from 900 to 1200 $m^2/g$, within the above range.

In order to adjust the BET specific surface area of carbon black within the above range, the bulk density of carbon black is preferably within a range from 10 to 50 g/liter, more preferably from 15 to 40 g/liter, and particularly preferably from 22 to 35 g/liter. When the bulk density of carbon black is less than the above range, the BET specific surface area may be less than the above range and the particle diameter of fine metal particles to be supported tends to increase. On the other hand, when the bulk density exceeds the above range, the BET specific surface area exceeds the above range and electroconductivity decreases. Therefore, catalyst efficiency may decrease when the metal catalyst is used as a catalyst for fuel cell.

In order to adjust the BET specific surface area of carbon black within the above range and to prevent a decrease in catalytic activity due to clustering of a plurality of fine metal particles, those obtained by grinding a raw carbon black material having a chain structure so as to cut the chain structure are preferably used as carbon black.

As well known, carbon black is supplied in the state where a number of unit particles made of amorphous carbon are connected to a chain to form a chain structure referred to a "structure". In this state, a number of connected portions of unit particles are present and thus the surface area of the region where fine metal particles can be supported on the surface of each unit particle is limited. Therefore, the entire specific surface area is smaller than the above range and the particle diameter of fine metal particles to be supported on the surface of the fine metal particles by the liquid phase reduction method tends to increase due to the above-mentioned fusion during growth process. Further, since the distance between adjacent fine metal particles is too small, clustering may occur even at comparatively low temperature at about 100° C. or lower to form coarse particles. When fine metal particles are converted into coarse particles, there may arise a problem such as decrease in catalytic activity.

On the other hand, in case of carbon black obtained by grinding raw carbon black material having a chain structure so as to cut the chain structure, the connected portion between unit particles decreases and the surface area of the region where fine metal particles can be supported on the surface of each unit particle increases, and thus the entire specific surface area increases. Therefore, by adjusting the BET specific surface area of carbon black within the above range thereby to prevent fusion of fine metal particles to be supported, the particle diameter can be decreased as small as possible and a decrease in catalytic activity due to clustering of a plurality of fine metal particles can be prevented.

Examples of the method of grinding so as to cut the chain structure of the raw carbon black material include, for example, a method of high speed rotary grinding using a sirocco fan, and a grinding method using a ball mill or a roll mill.

In the metal catalyst having a structure in which a number of fine metal particles having a particle diameter of 3 nm or less are supported on the surface of carrier particles, the distance between centers of adjacent fine metal particles is preferably less than 15 nm. When the distance between centers of adjacent fine metal particles is 15 nm or more, catalytic activity of the metal catalyst may decrease because a supported amount of fine metal particles is too small. The distance between nearest neighbor surfaces of adjacent fine metal particles is preferably 0.3 nm or more. When the distance between nearest neighbor surfaces is less than 0.3 nm, clustering may occur even at comparatively low temperature at about 100° C. or lower to form coarse particles. When fine metal particles are converted into coarse particles, there arises a problem such as decrease in catalytic activity.

Considering that the supported amount of metal particles is increased as large as possible while preventing the occurrence of clustering and also catalytic activity is further improved, the distance between adjacent fine metal particles is more preferably within a range from 1.0 to 5.0 nm in terms of the distance between nearest neighbor surfaces. Both the distance between centers of adjacent fine metal particles and the distance between the nearest neighbor surfaces are values measured actually using a transmission electron microscope. In order to adjust the distance between adjacent fine metal particles within the above range, the specific surface area of carrier particles may be adjusted and the supported amount of fine metal particles may be adjusted.

Considering that catalytic activity of the metal catalyst is further improved, the supported amount of fine metal particles represented by percentage of the weight of fine metal particles to the weight of the metal catalyst is preferably within a range from 10 to 60% by weight. When the supported amount of fine metal particles is less than 10% by weight, the distance between adjacent fine metal particles exceeds the above range and the surface of exposed carbon is widely present in the passway between fine metal particles into which an oxygen gas or a hydrogen gas is diffuses, and thus diffusion of the gas is inhibited and catalytic activity may decrease.

On the other hand, when the supported amount of fine metal particles exceeds 60% by weight, the distance between adjacent fine metal particles is less than the above range and clustering may occur even at comparatively low temperature at about 100° C. or lower to form coarse particles. When fine metal particles are converted into coarse particles, there arises a problem of decrease in catalytic activity. Considering that catalytic activity is further improved while preventing the occurrence of clustering, the supported amount of fine metal particles is more preferably from 15 to 50% by weight.

Particularly, in the metal catalyst having a structure in which a number of fine metal particles are supported on the surface of carrier particles and also using an oxygen gas for carrying out the reduction reaction in a positive electrode of a fuel cell, the exposed crystal plane of the respective fine metal particles is preferably oriented to the (111) plane which is excellent in catalytic activity of the reduction reaction. Consequently, catalytic activity in the reduction reaction of the oxygen gas can be further improved.

In order to orient the exposed crystal plane of fine metal particles to the (111) plane, the kind of carrier particles used in combination with fine metal particles may be selected and the method for deposition of fine metal particles may be selected, and the surface state of carrier particles may be adjusted. For example, when particles of carbon such as carbon black are used as carrier particles and also fine platinum particles are supported by depositing platinum on the surface of the particles of the carbon using the liquid phase reduction method, the exposed crystal plane can be automatically oriented to the (111) plane.

<<Method for Production of Metal Catalyst>>

(Formation of Fine Metal Particles)

In order to adjust the particle diameter of fine metal particles to be supported on the surface of carrier particles to 3 nm or less, the fine metal particles are preferably formed by the liquid phase reduction method. Specifically, a predetermined amount of carrier particles are dispersed and a reaction system of a liquid phase containing a reducing agent and a metal compound serving as an ion source of metal at predetermined concentrations is prepared, and then this reaction system is reacted under predetermined temperature conditions for a fixed time, thus making it possible to deposit the reduced metal on the surface of the carrier particles dispersed in the liquid phase in the form of fine particles.

In this case, the particle diameter of fine metal particles can be adjusted by varying the temperature or viscosity of the solution with or without stirring, and varying the stirring rate in case of stirring. That is, the lower the temperature of the solution becomes, the higher the viscosity becomes, and the lower the stirring rate becomes in case of stirring, the particle diameter of fine metal particles to be formed becomes smaller. Therefore, it is preferred to set the temperature, viscosity and stirring conditions while considering the kind and particle diameter of fine metal particles to be formed, the kind of a reducing agent to be used, and other conditions.

As the ion source of metal constituting fine metal particles, various metal compounds containing a metal element, which are soluble in the reaction system of the liquid phase, can be used. If possible, the metal compound does not preferably contain an impurity element such as halogen element (for example, chlorine), sulfur, phosphorus or boron, which may function as an origin of nuclear growth thereby to cause abnormal nuclear growth. Even if the metal compound containing the impurity element is used, fine metal particles having a small particle diameter can be supported on the surface of carrier particles by adjusting the reaction conditions to suppress abnormal nuclear growth.

Examples of the metal compound suited for use as an ion source of metal, although not limited, in case of platinum, dinitrodiammine platinum (II) ($Pt(NO_2)_2(NH_3)_2$) and hydrogen hexachloroplatinate (IV) hexahydrate ($H_2[PtCl_6].6H_2O$) is mentioned, and dinitrodiammine platinum (II) is particularly preferable.

In case of palladium, palladium (II) chloride solution ($PdCl_2$) is mentioned, and in case of gold, hydrogen tetrachloroaurate (III) tetrahydrate ($HAuCl_4.4H_2O$) is mentioned. In case of silver, silver (I) nitrate ($AgNO_3$) and silver methanesulfonate ($CH_3SO_3Ag$) are mentioned, and silver (I) nitrate is particularly preferable. In case of rhodium, rhodium (III) chloride solution ($RhCl_3.3H_2O$) is mentioned, in case of iridium, hydrogen hexachloroiridate (III) hexahydrate ($2(IrCl_6).6H_2O$) is mentioned, in case of ruthenium, ruthenium (III) nitrate solution ($Ru(NO_3)_3$) is mentioned, and in case of osmium, osmium (VIII) oxide ($OsO_4$) is mentioned.

In case of cobalt, cobalt (II) nitrate hexahydrate ($Co(NO_3)_2.6H_2O$), cobalt (II) sulfate heptahydrate ($CoSO_4.7H_2O$), basic cobalt (II) carbonate ($xCoCO_3.yCo(OH)_2.zH_2O$, wherein x, y and z vary depending on the preparation method and, usually, x=2, y=3, and z=1), cobalt (II) chloride hexahydrate ($CoCl_2.6H_2O$), acetylacetone cobalt (II) ($Co[CH(COCH_3)_2]_2$) and cobalt (II) acetate tetrahydrate ($Co(CH_3COO)_2.4H_2O$) are mentioned. In case of manganese, manganese (II) nitrate hydrate ($Mn(NO_3)_2.nH_2O$, n=4 to 6), manganese (II) chloride tetrahydrate ($MnCl_2.4H_2O$) and manganese (II) ammonium sulfate hexahydrate ($Mn(NH_4)_2(SO_4)_2.6H_2O$) are mentioned.

In case of nickel, nickel (II) nitrate hexahydrate ($Ni(NO_3)_2.6H_2O$), nickel (II) chloride hexahydrate ($NiCl_2.6H_2O$), nickel (II) sulfate heptahydrate ($NiSO_4.7H_2O$), acetylacetone nickel (II) ($Ni[CH(COCH_3)_2]_2$), basic nickel carbonate(II) ($aNiCO_3.bNi(OH)_2.cH_2O$, wherein a, b and c vary depending on the preparation method and, usually, a=2, b=3, and c=4) and nickel(II) acetate tetrahydrate ($Ni(CH_3COO)_2.4H_2O$) are mentioned. In case of iron, iron (III) nitrate hexahydrate, enneahydrate ($Fe(NO_3)_3.6H_2O, 9H_2O$), iron (II) chloride tetrahydrate ($FeCl_2.4H_2O$), iron (II) sulfate heptahydrate ($FeSO_4.7H_2O$) and acetylacetone iron (III) ($Fe[CH(COCH_3)_2]_3$) are mentioned.

In case of chromium, acetylacetone chromium (III) ($Cr[CH(COCH_3)_2]_3$), chromium (II) chloride ($CrCl_2$) and chromium (III) nitrate enneahydrate ($Cr(NO_3)_3.9H_2O$) are mentioned. In case of molybdenum, molybdenum (V) chloride ($MOCl_5$) is mentioned. In case of titanium, titanium (IV) chloride solution ($TiCl_4$) is mentioned.

As the reducing agent, a reducing agent having a reducing power as weak as possible is preferably used, as described above. Examples of the reducing agent having a weak reducing powder include alcohols such as methanol, ethanol and isopropyl alcohol; ascorbic acid; ethylene glycol; glutathione; organic acids (for example, citric acid, malic acid and tartaric acid); reducing sugars (for example, glucose, galactose, mannose, fructose, sucrose, maltose, raffinose and stachyose); and sugar alcohols (for example, sorbitol), and reducing sugars and sugar alcohols as derivatives thereof or alcohols are particularly preferable. When alcohols and other reducing agents are used in combination as the reducing agent, the supported rate of fine metal particles on the surface of carrier particles can be increased.

In the reaction system of the liquid phase, there may be added various additives, for example, pH adjustors for adjusting the pH within a range suited for reducing ions of metal thereby to deposit the metal, dispersing agents for dispersing carrier particles, and viscosity adjustors for adjusting viscosity of the liquid phase.

As the pH adjustor among these additives, any of various acids and alkalis can be used, and it is preferred to use an acid or alkali which does not contain an impurity element which may function as an origin of nuclear growth thereby to cause abnormal nuclear growth. Examples of the acid containing no impurity element include nitric acid, and examples of the alkali include ammonia water.

Preferable range of the pH of the liquid phase varies depending on the kind of metal to be deposited, and the kind of the metal compound as an ion source of metal. As the pH decreases within a preferable range, the particle diameter of fine metal particles formed tends to decrease. Therefore, it is preferred to decide whether or not the pH adjustor is added and what amount is added if added, considering the kind and diameter of fine metal particles to be formed, the kind of a reducing agent to be used, and other conditions.

As the dispersing agent and viscosity adjustor, conventionally known various compounds can be used and a polymeric dispersing agent with the both functions is preferably used. Examples of the polymeric dispersing agent include amine-based polymeric dispersing agents such as polyethyleneimine and polyvinyl pyrrolidone; hydrocarbon-based polymeric dispersing agents having a carboxylic acid group in the molecule, such as carboxymethyl cellulose; and copolymers having both a polyethyleneimine moiety and a polyethylene oxide moiety in a molecule (hereinafter referred to as a "PEI-PO copolymer").

The amount of the polymeric dispersing agent is not specifically limited. However, as the amount increases, viscosity of the liquid phase increases and the particle diameter of fine metal particles formed tends to decrease. Therefore, a preferable range of the amount is preferably set considering the particle diameter of fine metal particles to be prepared, the kind of the reducing agent to be used and other conditions.

(Reduction Treatment of Fine Metal Particles)

In order to prepare the metal catalyst of the present invention by adjusting the proportion of metallic bond state of fine metal particles formed in the above-mentioned step to 40% or more, a reduction treatment capable of lowering the oxidation state by reducing fine metal particles is preferably conducted, as described above. Examples of the reduction treatment include, for example, a liquid phase method in which fine metal particles are reduced by the action of a reducing agent in a liquid phase, a vapor phase method in which fine metal particles are reduced by the action of a reducing agent in a gas phase, a microwave heating method in which fine metal particles are reduced by microwave heating, and an electrochemical method in which fine metal particles are electrochemically reduced by applying an electric current in an electrolytic solution.

In the liquid phase method among these methods, fine metal particles are reduced by treating the fine metal particles supported on carrier particles with a treating solution of a liquid phase containing a reducing agent of a predetermined concentration. It is preferred to use, as the reducing agent, a reducing agent having a redox potential baser than that of metal to be reduced so as to improve productivity of the metal catalyst by improving efficiency of the reduction treatment. Specific examples thereof include trivalent titanium ion, sodium hypophosphite, hydrazine, divalent to tetravalent vanadium ions and sodium borohydride when fine metal particles are fine platinum particles.

Among these reducing agents, sodium hypophosphite and sodium borohydride are excellent in reducing power and efficiently reduce the surface of fine metal particles, thus making it possible to adjust the proportion of metallic bond state to the value as high as possible within the range of 40% or more. When the trivalent titanium ion itself is oxidized to the tetravalent titanium ion, it functions so as to reduce the surface of fine metal particles in the same reaction system thereby to adjust the proportion of metallic bond state to 40% or more. There is such an advantage that, when the titanium ion is reduced to the trivalent titanium ion by electrolyzing the solution in which the titanium ion is oxidized to the tetravalent titanium ion, the solution can be repeatedly used for the reduction treatment. The treatment temperature is, for example, preferably within a range from 40 to 70° C. when sodium borohydride is used as the reducing agent, and is preferably within a range from 30 to 50° C. when the trivalent titanium ion is used.

In the vapor phase method, fine metal particles are reduced by treating the fine metal particles supported on carrier particles with heating to a temperature within a range from 100 to 300° C. in a reducing atmosphere such as hydrogen gas for about 5 to 60 minutes. Examples of the reducing agent include, in addition to the above-mentioned hydrogen gas, ammonia gas. In the reduction treatment, a horizontal type ring furnace is used, for example. Carrier particles by which fine metal particles were supported are subjected to a reduction treatment after placing in the above horizontal type ring furnace in the state of being placed in a quartz glass boat.

In the microwave heating method, fine metal particles are reduced by microwave heating the fine metal particles supported on carrier particles in an inert gas atmosphere or a reducing gas atmosphere. The treatment is conducted under the conditions of an output of 300 to 600 W and a treating time of about 20 to 60 seconds. A microwave oven can be used for microwave heating. According to this method, since a heat source is dispersed microscopically and uniformly as compared with heating at high temperature for a long time using a conventional electric oven, fine metal particles can be momentarily warmed up and heated and can be subjected to a reduction treatment while avoiding aggregation and sintering of fine metal particles as much as possible.

In the electrochemical method, fine metal particles can be reduced by dipping the fine metal particles supported on carrier particles in an electrolytic solution in the state of being supported by filling into porous pores of a cathode having the porous surface, and applying direct current between the cathode and an anode made of a material which is insoluble in the electrolytic solution, such as titanium or platinum. This method has such an advantage that the proportion of metallic bond state of fine metal particles can be adjusted to any value within a range of 40% or more by varying conditions such as value of current to be applied between both electrodes.

The resulting metal catalyst of the present invention contains fine metal particles having a small particle diameter and a large specific surface area and also has high catalytic activity which is balanced with the particle diameter and the specific surface area of fine metal particles, and therefore it can be preferably used as a catalyst for fuel cell or a catalyst for automobile exhaust gas, as described above.

EXAMPLES

Example 1

Carbon black [VULCAN XC 72R Carbon, manufactured by Cabot Corp., BET specific surface area: 222 m²/g, bulk density: 95 g/liter] as carrier particles, ethanol and fructose as a reducing agent, and a nitrate solution of dinitrodiammine platinum (II) [concentration of platinum: 50 g/liter] were added to pure water, and then the pH was adjusted to 1.5 by further adding ammonia water to prepare a reaction system of a liquid phase. The concentration of carbon black in the reaction system was adjusted to 2 g/liter, the concentration of ethanol was adjusted to 10 ml/liter, the concentration of fructose was adjusted to 0.10 M (mol/liter), and the concentration of the nitrate solution of dinitrodiammine platinum (II) (the concentration of platinum ions) was adjusted to 0.02 M.

Then, this reaction system was reacted for 240 hours at reflux while maintaining the reaction temperature at 40° C. under stirring at a stirring rate of 400 rpm using a magnetic stirrer thereby to deposit fine platinum particles on the surface of carbon black. After solid-liquid separation, the resulting solid was washed with an aqueous sodium borohydride solution [concentration: 10 g/liter] at 40° C. thereby to reduce platinum particles to prepare a platinum catalyst.

Example 2

In the same manner as in Example 1, except that the concentration of fructose as the reducing agent was adjusted to 0.20 M, a platinum catalyst was prepared.

Example 3

In the same manner as in Example 1, except that the concentration of fructose as the reducing agent was adjusted to 0.20 M and the pH of the reaction system was adjusted to 5, a platinum catalyst was prepared.

Example 4

In the same manner as in Example 1, except that the concentration of fructose as the reducing agent was adjusted to 0.20 M and the pH of the reaction system was adjusted to 9, a platinum catalyst was prepared.

Examples 5 to 8

In the same manner as in Examples 1 to 4, except that the solid obtained after solid-liquid separation was washed with an aqueous titanium trichloride solution [concentration of titanium ion: 0.5 mol/liter] at 40° C. thereby to reduce fine platinum particles, platinum catalysts were prepared.

Examples 9 to 12

In the same manner as in Examples 1 to 4, except that the solid obtained after solid-liquid separation was placed in a quartz glass boat, placed in a horizontal type ring furnace and then heated to 100° C. in a reducing atmosphere of hydrogen gas filled into the furnace for 60 minutes thereby to reduce fine platinum particles, platinum catalysts were prepared.

Examples 13 to 16

In the same manner as in Examples 1 to 4, except that the solid obtained after solid-liquid separation was placed in a microwave oven and then heated with 300 W microwave in an atmosphere of an inert gas filled into the microwave oven for 20 seconds thereby to reduce fine platinum particles, platinum catalysts were prepared.

Examples 17 to 20

In the same manner as in Examples 1 to 4, except that the solid obtained after solid-liquid separation was dipped in an aqueous 0.1 M perchloric acid solution as an electrolytic solution in the state of being supported by filling into pores of a porous carbon cathode and applying for 20 minutes a direct current at a current density of 10 μA/g between the cathode and a platinum black electrode as an anode under the conditions of the liquid temperature of 30° C. thereby to electrochemically reduce fine platinum particles, platinum catalysts were prepared.

Comparative Examples 1 to 4

In the same manner as in Examples 1 to 4, except that the solid obtained after solid-liquid separation was not reduced but only washed with water, platinum catalysts were prepared.

Comparative Examples 5 to 8

In the same manner as in Examples 1 to 4, except that the solid obtained after solid-liquid separation was heated in an electric furnace under an inert gas atmosphere at 250° C. for 24 hours thereby to reduce fine platinum particles, platinum catalysts were prepared.

Comparative Example 9

In the same manner as in Example 1, except that the same amount of mannose was used as the reducing agent in place of fructose and the reaction temperature was adjusted to 20° C., a platinum catalyst was prepared.

The platinum catalysts of the respective Examples and Comparative Examples were subjected to the following respective tests and characteristics were evaluated.

Measurement of Particle Diameter of Fine Platinum Particles

The particle diameter of fine platinum particles was determined by the following procedure. That is, an amount of CO adsorbed was determined by the CO adsorption method after treating the resulting platinum catalyst under the conditions of a pretreatment temperature of 120° C. and an adsorption temperature of 50° C., and then a surface area of fine platinum particles supported on the surface of carbon black was calculated from the results. A supported amount of fine platinum particles in the prepared platinum catalyst was measured by an ICP (inductively coupled plasma) atomic emission spectrometry, and then a particle diameter of the fine platinum particles supported on the surface of carbon black was calculated from the supported amount of fine platinum particles and the above surface area.

Measurement of Proportion of Metallic Bond State

Spectra showing a relation between binding energy of electrons and the signal strength of the electrons were determined by analyzing the obtained platinum catalyst using an X-ray photoelectron spectrometer. Among these spectra, Pt4d5 peak as a binding energy peak peculiar to the platinum is subjected to waveform separation to obtain a peak showing the metallic bond state of platinum elements, a peak showing the metastable bond state between a platinum element and an oxygen element and a peak showing the stable bond state between a platinum element and an oxygen element. Then, an area of each peak was measured and the proportion of the area of peak showing the metallic bond state based on the total area was determined as the proportion of metallic bond state on the surface of fine platinum particles. Analysis was conducted by using MONO Al Kα as an X-ray source and setting transmission energy to 17.90 eV.

As an example of the measurement results, a spectrum showing a relation between binding energy of electrons and the signal strength of the electrons in Example 1 is shown in FIG. 2. Among the spectrum of FIG. 2, a spectrum ascribed by subjecting to waveform separation of a Pt4d5 peak as a binding energy peak peculiar to the platinum is shown in FIG. 3.

Measurement of Electrochemical Surface Area

An electrochemical surface area ($m^2$/g-Pt) determined from hydrogen adsorption wave, which shows catalytic activity (electrochemical activity) of the resulting platinum catalyst was measured twice. Namely, it was measured immediately after the preparation of the catalyst (initial) and after dipping the catalyst in 0.01 M hydrochloric acid for 100 hours (after endurance). The measurement was conducted by a polarization measuring method using a three-electrode cell. In this case, a standard hydrogen electrode was used as a reference electrode, a platinum electrode was used as a counter electrode, and a carbon electrode comprising a platinum catalyst as a measuring sample supported thereon made in the same manner as in case of the measurement I of oxygen reduction current described hereinafter was used as a working electrode.

Measurement of Supported Amount of Fine Platinum Particles

The supported amount of fine platinum particles was measured by an ICP (inductive coupled plasma) atomic emission spectrometry, as described above.

Figure 4:
FIG. 4 is a transmission electron microscope photograph showing a supported state of fine platinum particles in a platinum catalyst of Example 22 according to the present invention.
Figure 5:
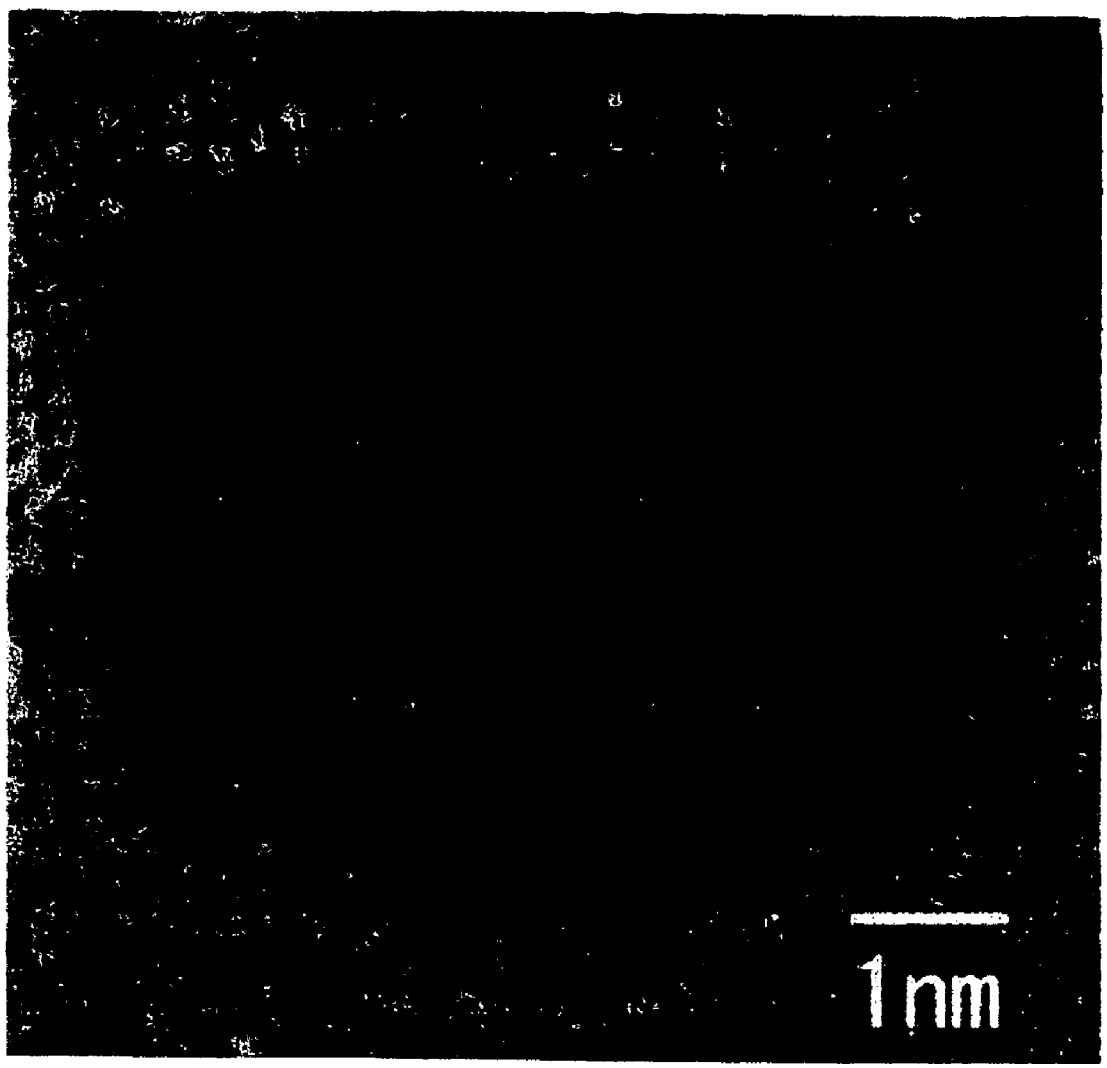
FIG. 5 is a transmission electron microscope photograph showing the state where one fine platinum particle is enlarged in the platinum catalyst of Example 22 according to the present invention.

Measurement of Distance between Adjacent Fine Metal Particles and Confirmation of Crystal Plane Orientation The distance between centers and the distance between nearest neighbor surfaces of adjacent fine metal particles supported on the surface of carbon black in the resulting platinum catalyst were measured using a transmission electron microscope. Exposed crystal plane orientation of the respective fine platinum particles in the resulting platinum catalyst was confirmed using a transmission electron microscope. As an example of a transmission electron microscope photograph, a transmission electron microscope photograph in Example 22 described hereinafter is shown in FIG. 4. Also a transmission electron microscope photograph showing a single enlarged fine platinum particle in Example 22 is shown in FIG. 5. FIG. 5 shows the state where fine platinum particles have exposed crystal plane orientation to the (111) plane.

The above results are shown in Tables 1 and 2.

TABLE 1

| | Reduction method | Particle diameter (nm) | Proportion of metallic bond state (%) | Distance between fine particles (nm) Distance between centers | Distance between surfaces | Supported amount (% by weight) | Crystal plane orientation | Electrochemical surface area ($m^2$/g-Pt) Initial | After endurance |
|---|---|---|---|---|---|---|---|---|---|
| Example 1 | Liquid phase A | 0.9 | 81 | 2.2 | 3.1 | 20 | (111) | 200 | 140 |
| Example 2 | Liquid phase A | 1.1 | 83 | 2.7 | 3.8 | 20 | (111) | 165 | 100 |
| Example 3 | Liquid phase A | 1.9 | 84 | 6.7 | 8.6 | 20 | (111) | 110 | 60 |
| Example 4 | Liquid phase A | 2.5 | 88 | 10.5 | 13.0 | 20 | (111) | 90 | 55 |
| Example 5 | Liquid phase B | 0.9 | 61 | 2.2 | 3.1 | 20 | (111) | 185 | 150 |
| Example 6 | Liquid phase B | 1.1 | 63 | 2.7 | 3.8 | 20 | (111) | 165 | 140 |
| Example 7 | Liquid phase B | 1.9 | 67 | 6.7 | 8.6 | 20 | (111) | 150 | 130 |
| Example 8 | Liquid phase B | 2.5 | 68 | 10.5 | 13.0 | 20 | (111) | 140 | 110 |
| Example 9 | Vapor phase | 0.9 | 83 | 2.2 | 3.1 | 20 | (111) | 210 | 143 |
| Example 10 | Vapor phase | 1.1 | 85 | 2.7 | 3.8 | 20 | (111) | 165 | 98 |
| Example 11 | Vapor phase | 1.9 | 87 | 6.7 | 8.6 | 20 | (111) | 125 | 58 |
| Example 12 | Vapor phase | 2.5 | 89 | 10.5 | 13.0 | 20 | (111) | 80 | 43 |
| Example 13 | Microwave heating | 0.9 | 41 | 2.2 | 3.1 | 20 | (111) | 100 | 90 |
| Example 14 | Microwave heating | 1.1 | 43 | 2.7 | 3.8 | 20 | (111) | 90 | 80 |
| Example 15 | Microwave heating | 1.9 | 46 | 6.7 | 8.6 | 20 | (111) | 85 | 75 |
| Example 16 | Microwave heating | 2.5 | 49 | 10.5 | 13.0 | 20 | (111) | 75 | 65 |

TABLE 2

| | Reduction method | Particle diameter (nm) | Proportion of metallic bond state (%) | Distance between fine particles (nm) Distance between centers | Distance between surfaces | Supported amount (% by weight) | Crystal plane orientation | Electrochemical surface area (m²/g-Pt) Initial | After endurance |
|---|---|---|---|---|---|---|---|---|---|
| Example 17 | Electrochemical reduction | 0.9 | 55 | 2.2 | 3.1 | 20 | (111) | 140 | 110 |
| Example 18 | Electrochemical reduction | 1.1 | 56 | 2.7 | 3.8 | 20 | (111) | 130 | 105 |
| Example 19 | Electrochemical reduction | 1.9 | 57 | 6.7 | 8.6 | 20 | (111) | 115 | 85 |
| Example 20 | Electrochemical reduction | 2.5 | 59 | 10.5 | 13.0 | 20 | (111) | 100 | 65 |
| Comparative Example 1 | None | 0.9 | 33 | 2.2 | 3.1 | 20 | — | 75 | 70 |
| Comparative Example 2 | None | 1.1 | 34 | 2.7 | 3.8 | 20 | — | 65 | 60 |
| Comparative Example 3 | None | 1.9 | 36 | 6.7 | 8.6 | 20 | — | 60 | 55 |
| Comparative Example 4 | None | 2.5 | 38 | 10.5 | 13.0 | 20 | — | 55 | 50 |
| Comparative Example 5 | Heating in electric furnace | 0.9 | 93 | 2.2 | 3.1 | 20 | — | 240 | 120 |
| Comparative Example 6 | Heating in electric furnace | 1.1 | 95 | 2.7 | 3.8 | 20 | — | 185 | 90 |
| Comparative Example 7 | Heating in electric furnace | 1.9 | 96 | 6.7 | 8.6 | 20 | — | 130 | 68 |
| Comparative Example 8 | Heating in electric furnace | 2.5 | 99 | 10.5 | 13.0 | 20 | — | 85 | 45 |
| Comparative Example 9 | Liquid phase A | 4.8 | 98 | 31.5 | 31.3 | 20 | — | 55 | 25 |

The following facts became apparent from the tables. In case of the platinum catalysts of Comparative Examples 1 to 4 in which fine platinum particles were not subjected to a reduction treatment, the proportion of metallic bond state on the surface of the fine platinum particles is less than 40% and also the electrochemical surface area is small in the initial stage, and thus catalytic activity is insufficient. In case of the platinum catalysts of Comparative Examples 5 to 8 in which fine platinum particles were subjected to a reduction treatment by heating in an electric surface, the proportion of metallic bond state on the surface of fine platinum particles is more than 40% and also the electrochemical surface area is large at the initial stage but drastically decreases after endurance, and thus aggregation and sintering of fine platinum particles occur.

In case of the platinum catalyst of Comparative Example 9 in which the particle diameter of fine platinum particles exceeds 3 nm, the proportion of metallic bond state on the surface of fine platinum particles is more than 40%, however, the electrochemical surface area is small in the initial stage, and thus catalytic activity is insufficient. On the other hand, in case of each of the platinum catalysts of Examples 1 to 20, the proportion of metallic bond state on the surface of fine platinum particles is more than 40% and also the electrochemical surface area shows a large value at the initial stage and causes less decrease after endurance, and thus it was confirmed that these platinum catalysts are excellent in catalytic activity for a long period.

In case of Comparative Example 9, the particle diameter of fine metal particles increases to 3 nm or more by using mannose as the reducing agent at the deposition of metal ions, and thus catalytic activity became insufficient, as described above. However, Comparative Example 9 does not mean that the use of mannose as the reducing agent is excluded. It is possible to adjust the particle diameter of fine metal particles to 3 nm or less by using mannose as the reducing agent and also controlling the other conditions. In that case, it is possible to improve catalytic activity by adjusting the proportion of metallic bond state on the surface of the resulting fine platinum particles to 40% more through the reduction treatment.

Examples 21 to 25

Carbon black [VULCAN XC 72R Carbon, manufactured by Cabot Corp., BET specific surface area: 222 m²/g, bulk density: 95 g/liter] as carrier particles, ethanol and fructose as a reducing agent, and a nitrate solution of dinitrodiammine platinum (II) [concentration of platinum: 50 g/liter] were added to pure water, and then the pH was adjusted to 2 by further adding ammonia water to prepare a reaction system of a liquid phase. The concentration of carbon black in the reaction system was adjusted to 2 g/liter, the concentration of ethanol was adjusted to 10 ml/liter, the concentration of fructose was adjusted to 0.01 M (mol/liter), and the concentration of the nitrate solution of dinitrodiammine platinum (II) (the concentration of platinum ions) was adjusted to 0.02 M.

Then, this reaction system was reacted for 6 hours at reflux while maintaining the reaction temperature at 90° C. under stirring at a stirring rate of 400 rpm using a magnetic stirrer thereby to deposit fine platinum particles on the surface of carbon black. After solid-liquid separation, the resulting solid was subjected to a reduction treatment by the following respective methods to prepare a platinum catalyst.

Example 21

The solid obtained after solid-liquid separation was placed in a microwave oven and then heated for 20 seconds with 300

W microwave in an atmosphere of an inert gas filled into the microwave oven thereby to reduce fine platinum particles.

Example 22

The solid obtained after solid-liquid separation was washed with an aqueous sodium borohydride solution [Concentration: 10 g/liter] at 40° C. thereby to reduce fine platinum particles.

Example 23

The solid obtained after solid-liquid separation was placed in a quartz glass boat, placed in a horizontal type ring furnace and then heated to 100° C. in a reducing atmosphere of hydrogen gas filled into the furnace and subjected to a treatment for 60 minutes thereby to reduce fine platinum particles.

Example 24

The solid obtained after solid-liquid separation was washed with an aqueous titanium trichloride solution [concentration of titanium ion: 0.5 mol/liter] at 40° C. thereby to reduce fine platinum particles.

Example 25

The solid obtained after solid-liquid separation was dipped in an aqueous 0.1 M perchloric acid solution as an electrolytic solution in the state of being supported by filling into pores of a porous carbon cathode and applying for 20 minutes a direct current at a current density of 10 µA/g between the cathode and a platinum black electrode as an anode under the conditions of the liquid temperature of 30° C. thereby to electrochemically reduce fine platinum particles.

Comparative Example 10

In the same manner as in Examples 21 to 25, except that the solid obtained after solid-liquid separation was not reduced but only washed with water, platinum catalysts were prepared.

Examples 26 to 30 and Comparative Example 11

In the same manner as in Examples 21 to 25 and Comparative Example 10, except that methanol and galactose were used as the reducing agent and also the concentration of methanol was adjusted to 10 ml/liter and the concentration of galactose was adjusted to 0.10 M (mol/liter) in the reaction system, platinum catalysts were prepared.

Examples 31 to 35 and Comparative Example 12

In the same manner as in Examples 21 to 25 and Comparative Example 10, except that isopropyl alcohol and fructose were used as the reducing agent and also the concentration of isopropyl alcohol was adjusted to 10 ml/liter and the concentration of fructose was adjusted to 0.10 M (mol/liter) in the reaction system, platinum catalysts were prepared.

Examples 36 to 40 and Comparative Example 13

In the same manner as in Examples 21 to 25 and Comparative Example 10, except that ethylene glycol was used as the reducing agent and the concentration of ethylene glycol was adjusted to 500 ml/liter in the reaction system and ammonia water was not added, platinum catalysts were prepared.

Example 41 to 45, Comparative Example 14

In the same manner as in Examples 21 to 25 and Comparative Example 10, except that methanol and galactose were used as the reducing agent and a PEI-PO copolymer [EPOM-IN(registered trademark) PAO306, manufactured by Nippon Shokubai Co., Ltd.] which is a polymeric dispersing agent was added as an additive, and also the concentration of methanol was adjusted to 10 ml/liter, the concentration of galactose was adjusted to 0.10 M (mol/liter) and the concentration of the PEI-PO copolymer was adjusted to 2 g/liter in the reaction system, platinum catalysts were prepared.

Examples 46 to 50 and Comparative Example 15

In the same manner as in Examples 21 to 25 and Comparative Example 10, except that methanol and galactose were used as the reducing agent and polyvinyl pyrrolidone (molecular weight: about 10000) which is a polymeric dispersing agent was added as an additive, and also the concentration of methanol was adjusted to 10 ml/liter, the concentration of galactose was adjusted to 0.10 M (mol/liter) and the concentration of polyvinyl pyrrolidone was adjusted to 2 g/liter in the reaction system, platinum catalysts were prepared.

Examples 51 to 55 and Comparative Example 16

In the same manner as in Examples 21 to 25 and Comparative Example 10, except that propylene glycol was used as the reducing agent and also the concentration of propylene glycol was adjusted to 500 ml/liter in the reaction system and ammonia water was not added, platinum catalyst were prepared.

Examples 56 to 60 and Comparative Example 17

In the same manner as in Examples 21 to 25 and Comparative Example 10, except that titanium tetrachloride was used as the reducing agent and polyvinyl pyrrolidone (molecular weight: about 10000) which is a polymeric dispersing agent was added as an additive, and also the concentration of titanium tetrachloride was adjusted to 0.20 M (mol/liter) and the concentration of polyvinyl pyrrolidone was adjusted to 2 g/liter in the reaction system, platinum catalysts were prepared.

Example 61 to 65 and Comparative Example 18

In the same manner as in Examples 21 to 25 and Comparative Example 10, except that vanadium sulfate was used as the reducing agent and polyvinyl pyrrolidone (molecular weight: about 10000) which is a polymeric dispersing agent was added as an additive, and also the concentration of vanadium sulfate was adjusted to 0.20 M (mol/liter) and the concentration of polyvinyl pyrrolidone was adjusted to 2 g/liter, platinum catalyst were prepared.

The platinum catalysts of the respective Examples and Comparative Examples were subjected to the above-mentioned respective tests and the following respective tests and characteristics were evaluated.

Measurement of Oxygen Reduction Current I

In the measurement, using a rotary disk electrode made of carbon and a potentiostat, first, a predetermined amount of a platinum catalyst was dispersed in a solvent mixture of water and ethanol (volume ratio: 1:1) and the resulting dispersion was dropped on the rotary disk electrode using a microsyringe. After drying, an ethanol solution containing 0.1% by weight of a perfluorosulfonic acid-polytetrafluoroethylene copolymer resin ($H^+$ type) [Nafion (registered trademark), manufactured by E.I. du Pont de Nemours and Co.] was dropped on the platinum catalyst on the rotary disk electrode and then dried to obtain a sample electrode as a working electrode.

After a three-electrode cell was assembled by using the working electrode in combination with a platinum electrode as a counter electrode and a standard hydrogen electrode as a reference electrode, an oxygen reduction current of the platinum catalyst on the sample electrode was measured by a polarization measuring method using an aqueous 0.1 M perchloric acid solution as an electrolytic solution. In the measurement, dissolved oxygen in the electrolytic solution was previously removed by bubbling nitrogen, and then an electrochemical surface area was measured by cyclic voltammetry under the conditions of a voltage within a range from 0.01 to 1.4 V and a scanning rate of 5 to 10 mV/second at the positive side.

After oxygen was saturated in the electrolytic solution by bubbling an oxygen gas having purity of 99.99% for 10 or more minutes, an oxygen reduction current of the catalyst was determined by measuring an average value of a reduction current at 0.9 V in case of polarizing within a range from 1.1 to 0 V while rotating the rotary disk electrode at a predetermined rotational speed within a range from 400 to 2000 rpm.

Figure 6:
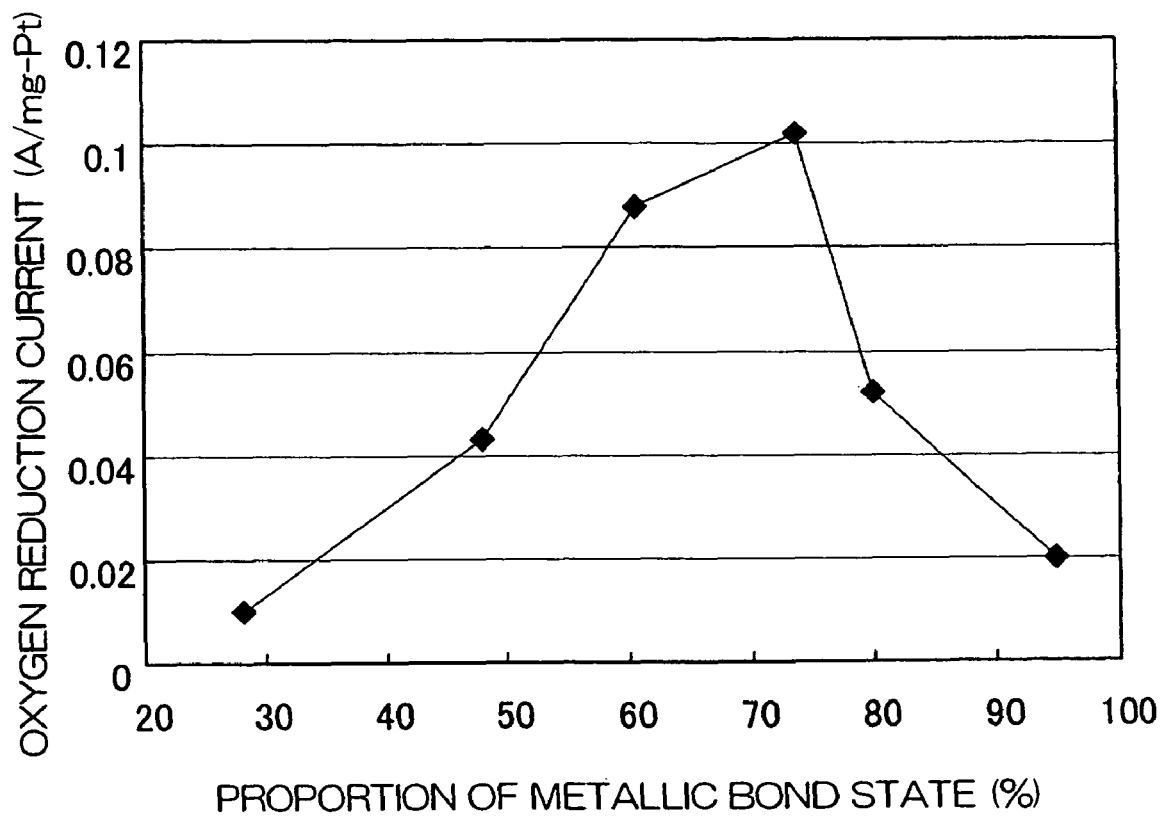
FIG. 6 is a graph showing a relation between the proportion of metallic bonding state of fine platinum particles and an oxygen reduction current in Examples 21 to 25 and Comparative Example 1 according to the present invention.

The above results are shown in Tables 3 to 5. A relation between the metallic bond state and the oxygen reduction current in Examples 21 to 25 and Comparative Example 10 is shown in FIG. 6.

TABLE 3

| | Reduction method | Particle diameter (nm) | Proportion of metallic bond state (%) | Distance between fine particles (nm) | | Supported amount (% by weight) | Crystal plane orientation | Initial electrochemical surface area ($m^2$/g-Pt) | Oxygen reduction current (A/mg-Pt) |
|---|---|---|---|---|---|---|---|---|---|
| | | | | Distance between centers | Distance between surfaces | | | | |
| Example 21 | Microwave heating | 0.6 | 95 | 5.0 | 4.4 | 20 | (111) | 140 | 0.02 |
| Example 22 | Liquid phase A | 0.6 | 80 | 3.6 | 3.0 | 20 | (111) | 205 | 0.05 |
| Example 23 | Vapor phase | 0.6 | 73.8 | 3.4 | 2.8 | 20 | (111) | 220 | 0.1 |
| Example 24 | Liquid phase B | 0.6 | 60.8 | 3.5 | 2.9 | 20 | (111) | 210 | 0.09 |
| Example 25 | Electrochemical reduction | 0.6 | 48 | 4.5 | 3.9 | 20 | (111) | 160 | 0.04 |
| Comparative Example 10 | None | 0.6 | 28.2 | 6.2 | 5.6 | 20 | — | 110 | 0.01 |
| Example 26 | Microwave heating | 0.8 | 84 | 6.2 | 5.4 | 31 | (111) | 130 | 0.018 |
| Example 27 | Liquid phase A | 0.8 | 76 | 4.5 | 3.7 | 31 | (111) | 190 | 0.04 |
| Example 28 | Vapor phase | 0.8 | 70 | 4.3 | 3.5 | 31 | (111) | 200 | 0.08 |
| Example 29 | Liquid phase B | 0.8 | 55 | 4.5 | 3.7 | 31 | (111) | 190 | 0.07 |
| Example 30 | Electrochemical reduction | 0.8 | 45 | 5.6 | 4.8 | 31 | (111) | 145 | 0.03 |
| Comparative Example 11 | None | 0.8 | 18.0 | 8.6 | 7.8 | 31 | — | 90 | 0.007 |
| Example 31 | Microwave heating | 0.9 | 88 | 6.5 | 5.6 | 40 | (111) | 115 | 0.015 |
| Example 32 | Liquid phase A | 0.9 | 78 | 4.6 | 3.7 | 40 | (111) | 175 | 0.035 |
| Example 33 | Vapor phase | 0.9 | 73 | 4.5 | 3.6 | 40 | (111) | 180 | 0.07 |
| Example 34 | Liquid phase B | 0.9 | 58 | 4.8 | 3.9 | 40 | (111) | 165 | 0.06 |
| Example 35 | Electrochemical reduction | 0.9 | 46 | 5.9 | 5.0 | 40 | (111) | 130 | 0.025 |
| Comparative Example 12 | None | 0.9 | 20.5 | 8.5 | 7.6 | 40 | — | 85 | 0.006 |

TABLE 4

| | Reduction method | Particle diameter (nm) | Proportion of metallic bond state (%) | Distance between fine particles (nm) | | Supported amount (% by weight) | Crystal plane orientation | Initial electrochemical surface area ($m^2$/g-Pt) | Oxygen reduction current (A/mg-Pt) |
|---|---|---|---|---|---|---|---|---|---|
| | | | | Distance between centers | Distance between surfaces | | | | |
| Example 36 | Microwave heating | 2 | 91 | 14.6 | 12.6 | 40 | (111) | 51 | 0.001 |
| Example 37 | Liquid phase A | 2 | 81 | 12.3 | 10.3 | 40 | (111) | 58 | 0.0015 |
| Example 38 | Vapor phase | 2 | 74 | 12.7 | 10.7 | 40 | (111) | 60 | 0.002 |
| Example 39 | Liquid phase B | 2 | 61 | 13.3 | 11.3 | 40 | (111) | 57 | 0.0015 |
| Example 40 | Electrochemical reduction | 2 | 49 | 14.3 | 12.3 | 40 | (111) | 52 | 0.0017 |

TABLE 4-continued

| | Reduction method | Particle diameter (nm) | Proportion of metallic bond state (%) | Distance between fine particles (nm) | | Supported amount (% by weight) | Crystal plane orientation | Initial electrochemical surface area ($m^2$/g-Pt) | Oxygen reduction current (A/mg-Pt) |
|---|---|---|---|---|---|---|---|---|---|
| | | | | Distance between centers | Distance between surfaces | | | | |
| Comparative Example 13 | None | 2 | 30 | 15.4 | 13.4 | 40 | — | 48 | 0.0001 |
| Example 41 | Microwave heating | 1.2 | 89 | 8.4 | 7.2 | 30 | (111) | 52 | 0.008 |
| Example 42 | Liquid phase A | 1.2 | 75 | 7.7 | 6.5 | 30 | (111) | 57 | 0.007 |
| Example 43 | Vapor phase | 1.2 | 69 | 7.4 | 6.2 | 30 | (111) | 60 | 0.009 |
| Example 44 | Liquid phase B | 1.2 | 57 | 7.6 | 6.4 | 30 | (111) | 58 | 0.008 |
| Example 45 | Electrochemical reduction | 1.2 | 43 | 8.4 | 7.2 | 30 | (111) | 52 | 0.006 |
| Comparative Example 14 | None | 1.2 | 12 | 9.1 | 7.9 | 30 | — | 47 | 0.002 |
| Example 46 | Microwave heating | 1.6 | 87 | 14.5 | 12.9 | 20 | (111) | 29 | 0.002 |
| Example 47 | Liquid phase A | 1.6 | 73 | 14.5 | 12.9 | 20 | (111) | 29 | 0.003 |
| Example 48 | Vapor phase | 1.6 | 66 | 14.1 | 12.5 | 20 | (111) | 30 | 0.003 |
| Example 49 | Liquid phase B | 1.6 | 54 | 15.0 | 13.4 | 20 | (111) | 28 | 0.002 |
| Example 50 | Electrochemical reduction | 1.6 | 44 | 14.5 | 12.9 | 20 | (111) | 29 | 0.002 |
| Comparative Example 15 | None | 1.6 | 13 | 15.5 | 13.9 | 20 | — | 27 | 0.001 |

TABLE 5

| | Reduction method | Particle diameter (nm) | Proportion of metallic bond state (%) | Distance between fine particles (nm) | | Supported amount (% by weight) | Crystal plane orientation | Initial electrochemical surface area ($m^2$/g-Pt) | Oxygen reduction current (A/mg-Pt) |
|---|---|---|---|---|---|---|---|---|---|
| | | | | Distance between centers | Distance between surfaces | | | | |
| Example 51 | Microwave heating | 2.2 | 93 | 14.8 | 12.6 | 39 | (111) | 46 | 0.0009 |
| Example 52 | Liquid phase A | 2.2 | 83 | 12.5 | 10.3 | 39 | (111) | 47 | 0.0013 |
| Example 53 | Vapor phase | 2.2 | 75 | 12.9 | 10.7 | 39 | (111) | 54 | 0.0018 |
| Example 54 | Liquid phase B | 2.2 | 65 | 13.5 | 11.3 | 39 | (111) | 53 | 0.0014 |
| Example 55 | Electrochemical reduction | 2.2 | 53 | 14.5 | 12.3 | 39 | (111) | 51 | 0.0016 |
| Comparative Example 16 | None | 2.2 | 33 | 15.6 | 13.4 | 39 | — | 44 | 0.0001 |
| Example 56 | Microwave heating | 2.3 | 91 | 16.6 | 14.3 | 40 | (111) | 43 | 0.0007 |
| Example 57 | Liquid phase A | 2.3 | 81 | 16.6 | 14.3 | 40 | (111) | 43 | 0.0012 |
| Example 58 | Vapor phase | 2.3 | 74 | 16.3 | 14.0 | 40 | (111) | 44 | 0.0016 |
| Example 59 | Liquid phase B | 2.3 | 62 | 16.6 | 14.3 | 40 | (111) | 43 | 0.0012 |
| Example 60 | Electrochemical reduction | 2.3 | 50 | 16.6 | 14.3 | 40 | (111) | 43 | 0.0014 |
| Comparative Example 17 | None | 2.3 | 28 | 17.3 | 15.0 | 40 | — | 41 | 0.00008 |
| Example 61 | Microwave heating | 2.3 | 89 | 16.6 | 14.3 | 40 | (111) | 43 | 0.0007 |
| Example 62 | Liquid phase A | 2.3 | 79 | 16.6 | 14.3 | 40 | (111) | 43 | 0.0012 |
| Example 63 | Vapor phase | 2.3 | 71 | 16.3 | 14.0 | 40 | (111) | 44 | 0.0015 |
| Example 64 | Liquid phase B | 2.3 | 60 | 16.6 | 14.3 | 40 | (111) | 43 | 0.0011 |
| Example 65 | Electrochemical reduction | 2.3 | 51 | 16.6 | 14.3 | 40 | (111) | 43 | 0.0013 |
| Comparative Example 18 | None | 2.3 | 26 | 17.7 | 15.4 | 40 | — | 40 | 0.00007 |

It was confirmed from the tables and the drawing that the proportion of metallic bond state of fine platinum particles is necessarily 40% or more, preferably 90% or less, and particularly preferably from 50 to 80% so as to improve catalytic activity of the metal catalyst while excluding an adverse influence due to catalyst poison.

Examples 66 to 72

Carbon black of any one of the followings as carrier particles, ethanol and fructose as a reducing agent, and a nitrate solution of dinitrodiammine platinum (II) [concentration of platinum: 50 g/liter] were added to pure water, and then the pH was adjusted to 1.5 by further adding ammonia water to prepare a reaction system of a liquid phase. The concentration of carbon black in the reaction system was adjusted to 2 g/liter, the concentration of ethanol was adjusted to 50 ml/liter, the concentration of fructose was adjusted to 0.10 M (mol/liter), and the concentration of the nitrate solution of dinitrodiammine platinum (II) (the concentration of platinum ions) was adjusted to 0.02 M.

Example 66

VULCAN XC72 R manufactured by Cabot Corp., BET specific surface area: 222 m$^2$/g, bulk density: 95 g/liter Example 67

Carbon black obtained by surface-treating KETJENBLACK EC manufactured by LION Corp. with H$_2$O$_2$, BET specific surface area: 513 m$^2$/g, bulk density: 17 g/liter Example 68

KETJENBLACK EC manufactured by LION Corp., BET specific surface area: 804 m$^2$/g, bulk density: 15 g/liter Example 69

KETJENBLACK ECP manufactured by LION Corp., BET specific surface area: 820 m$^2$/g, bulk density: 32 g/liter Example 70

KETJENBLACK EC600JD manufactured by LION Corp., BET specific surface area: 1270 m$^2$/g, bulk density: 20 g/liter Example 71

KETJENBLACK ECP600JD manufactured by LION Corp., BET specific surface area: 1301 m$^2$/g, bulk density: 42 g/liter Example 72

Activated carbon obtained by grinding steam activated carbon of a phenol resin using a sirocco fan, BET specific surface area: 2015 m$^2$/g, bulk density: 100 g/liter Then, this reaction system was reacted for 6 hours at reflux while maintaining the reaction temperature at 90° C. under stirring at a stirring rate of 400 rpm using a magnetic stirrer thereby to deposit fine platinum particles on the surface of carbon black. The solid obtained after solid-liquid separation was placed in a quartz glass boat, placed in a horizontal type ring furnace and then heated to 100° C. in a reducing atmosphere of hydrogen gas filled into the furnace and subjected to a treatment for 30 minutes thereby to reduce fine platinum particles to prepare a platinum catalyst.

The platinum catalysts of the respective Examples were subjected to the above-mentioned respective tests and the following respective tests and characteristics were evaluated.

Measurement of Oxygen Reduction Current II

After a three-electrode cell was assembled by using the working electrode made in the same manner as in case of the measurement of oxygen reduction current I in combination with a platinum electrode as a counter electrode and a standard hydrogen electrode as a reference electrode, an oxygen reduction current of the platinum catalyst on the sample electrode was measured by a polarization measuring method using an aqueous 0.1 M perchloric acid solution as an electrolytic solution.

In the measurement, an operation of varying a voltage within a range from 0.01 to 1.4 V under the conditions of a scanning rate of 0.1 V/second at the positive side while removing dissolved oxygen in the electrolytic solution by continuously bubbling nitrogen was repeated 1000 times. Then, a reduction current value at 0.9 V in case of varying a voltage within a range from 1.1 to 0.2 V under the conditions of a scanning rate of 0.01 V/second at the negative side while continuously bubbling an oxygen gas having purity of 99.99% was taken as an oxygen reduction current per unit platinum of the catalyst.

The results are shown in Table 6.

TABLE 6

| | BET specific surface area of carbon black | Particle diameter (nm) | Proportion of metallic bond state (%) | Distance between fine particles (nm) | | Supported amount (% by weight) | Crystal plane orientation | Oxygen reduction current (mA/mg-Pt) |
|---|---|---|---|---|---|---|---|---|
| | | | | Distance between centers | Distance between surfaces | | | |
| Example 66 | 222 | 2.4 | 83 | 5.3 | 7.7 | 40 | (111) | 33 |
| Example 67 | 513 | 1.5 | 81 | 4.3 | 5.8 | 40 | (111) | 42 |
| Example 68 | 804 | 0.9 | 81 | 2.5 | 3.4 | 40 | (111) | 44 |
| Example 69 | 820 | 0.9 | 82 | 2.5 | 3.4 | 40 | (111) | 53 |
| Example 70 | 1270 | 0.6 | 83 | 1.7 | 2.3 | 40 | (111) | 62 |
| Example 71 | 1301 | 0.6 | 81 | 1.7 | 2.3 | 40 | (111) | 52 |
| Example 72 | 2015 | 0.5 | 80 | 1.7 | 2.2 | 40 | (111) | 33 |

It was confirmed from the table that the BET specific surface area of carbon black is preferably within a range from 500 to 1500 m$^2$/g and the bulk density is preferably within a range from 10 to 50 g/liter so as to support fine metal particles having a particle diameter as small as possible on the surface of carbon black as carrier particles by a liquid phase reduction method and to enhance electroconductivity of carbon black.

The invention claimed is:

1. A metal catalyst containing carrier particles and a number of fine metal particles supported on a surface of the carrier particles characterized in that the fine metal particles have a particle diameter of 3 nm or less and have a proportion of metallic bond state of 40% or more, which is obtained by subjecting to waveform separation of a binding energy peak peculiar to the metal as measured by using an X-ray photoelectron spectrometer, a distance between centers of adjacent fine metal particles is less than 15 nm, and a distance between nearest neighbor surfaces of adjacent fine metal particles is 0.3 nm or more on the surface of carrier particles.

2. The metal catalyst according to claim 1, wherein the fine metal particles have the proportion of metallic bond state of 90% or less.

3. The metal catalyst according to claim 1, wherein the fine metal particles have the proportion of metallic bond state of 50 to 80%.

4. The metal catalyst according to claim 1, wherein the fine metal particles are fine platinum particles and have the proportion of metallic bond state of 40% or more, which is obtained by subjecting to waveform separation of a Pt4d5 peak as a binding energy peak peculiar to the platinum as measured by using an X-ray photoelectron spectrometer.

5. The metal catalyst according to claim 1, wherein the fine metal particles are fine particles made of at least one metal selected from the group consisting of platinum, palladium, gold, silver, rhodium, iridium, ruthenium, osmium, cobalt, manganese, nickel, iron, chromium, molybdenum and titanium.

6. The metal catalyst according to claim 1, wherein a supported amount of fine metal particles is from 10 to 60% by weight.

7. The metal catalyst according to claim 1, wherein an exposed crystal plane of the respective fine metal particles is oriented to the (111) plane.

8. The metal catalyst according to claim 1, wherein a number of fine metal particles are supported on a surface of carbon black as carrier particles and a BET specific surface area of the carbon black is from 500 to 1500 m$^2$/g.

9. The metal catalyst according to claim 8, wherein a bulk density of the carbon black is 10 to 50 g/liter.

10. The metal catalyst according to claim 8, wherein the carbon black was obtained by grinding raw carbon black material having a chain structure so as to cut the chain structure.

11. The metal catalyst according to claim 1, wherein a number of fine metal particles are supported on a surface of carrier particles by reducing ions of metal to be deposited through an action of a reducing agent in a reaction system of a liquid phase containing the carrier particles dispersed therein, thereby to deposit the metal on a surface of the carrier particles in a form of fine particles.

12. The metal catalyst according to claim 1, which is used as a catalyst for fuel cell or a catalyst for automobile exhaust gas.

* * * * *